Oct. 8, 1957     H. BROWN     2,808,771
ROLLING SPIRAL CULTIVATOR
Filed Feb. 15, 1954     2 Sheets-Sheet 1
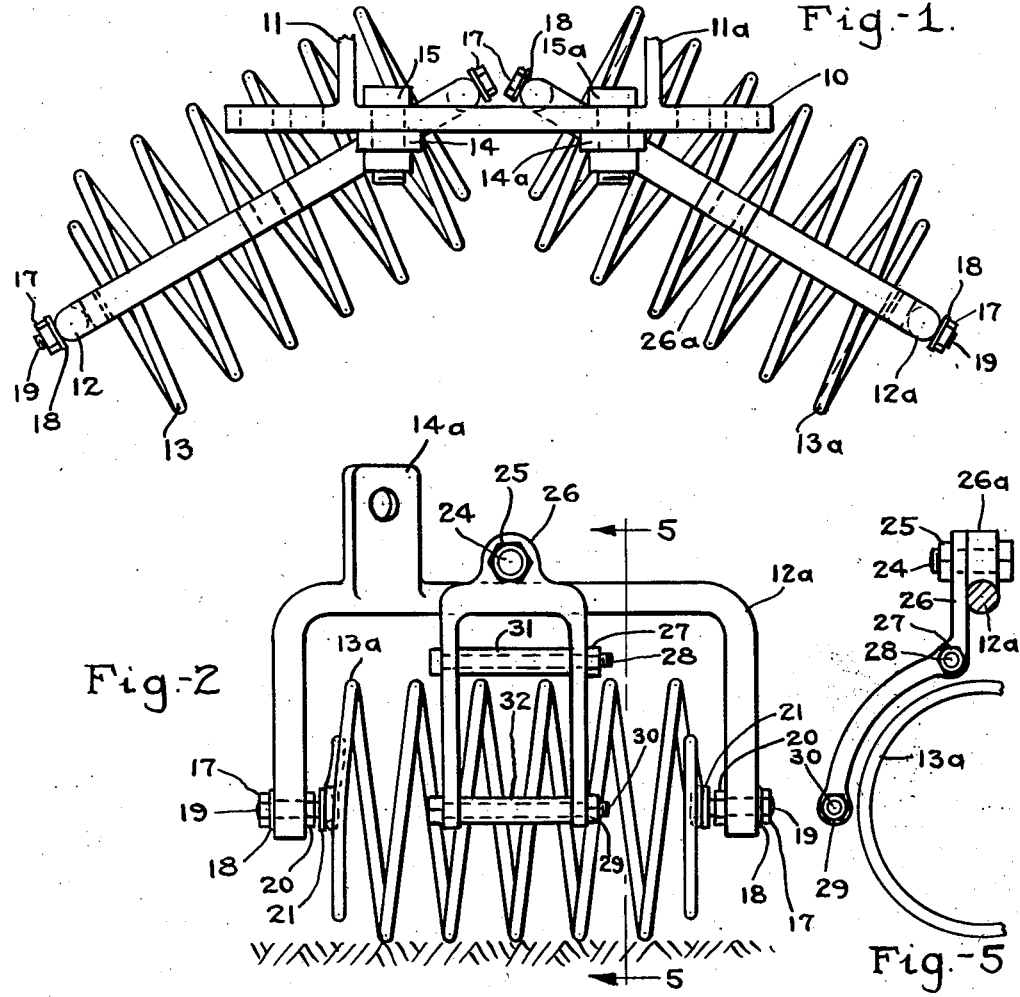
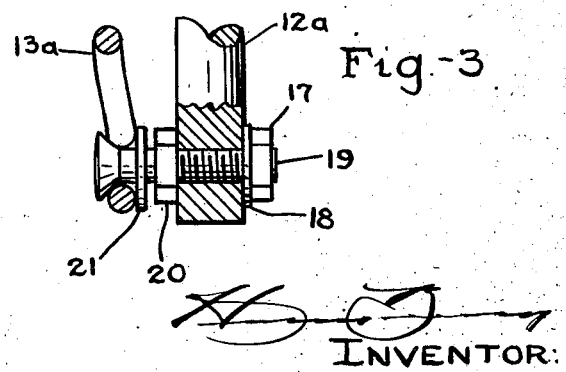
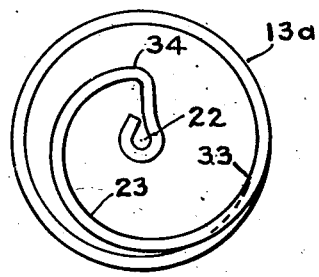
INVENTOR:

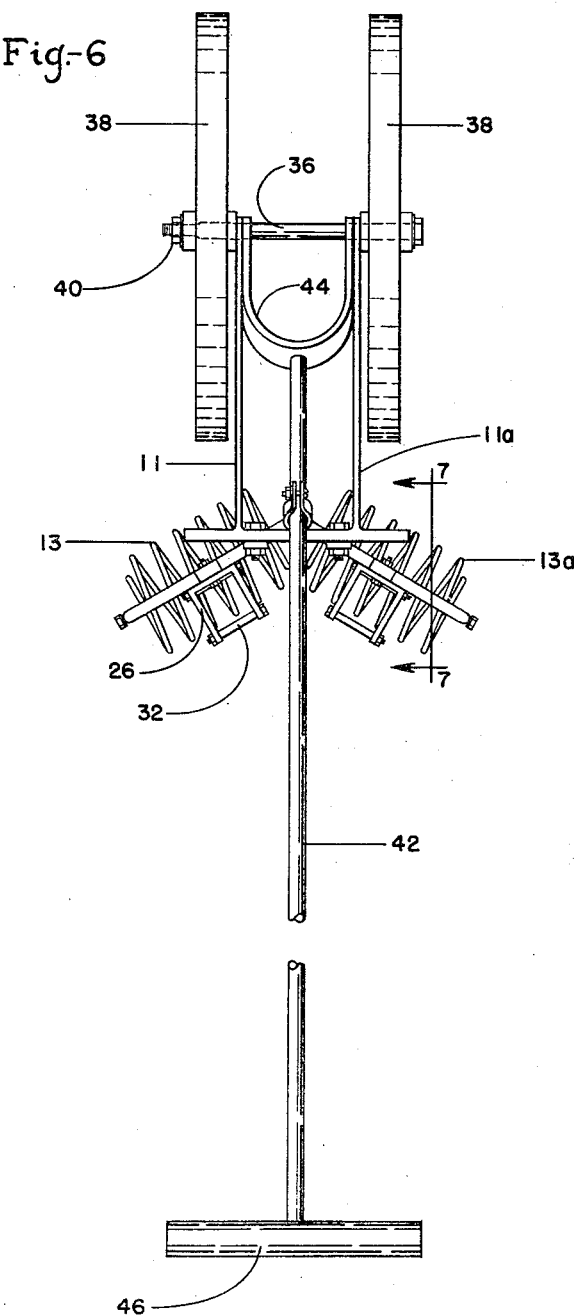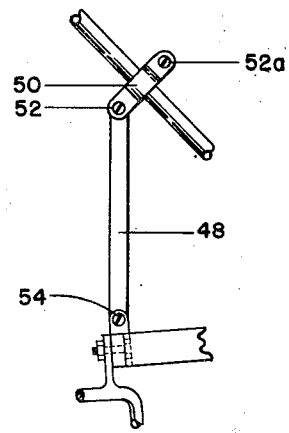

2,808,771
ROLLING SPIRAL CULTIVATOR

Harrison Brown, Fargo, N. Dak.

Application February 15, 1954, Serial No. 410,145

5 Claims. (Cl. 97—52)

This invention relates to improvements in a rotary cultivator. In general the invention relates to a rotary cultivator incorporating a specially constructed coiled spring as the ground-engaging portion used for cultivating row crops, and in removing weeds from between the rows of the desirable vegetation when the cultivator is passed between parallel rows of a crop, and the invention is also applicable for use in thinning row crops when the cultivator is operated transversely of the row crops. In particular the invention is concerned with one or more ground engaging members formed as a specially constructed helix from tempered steel and supported at an angle to the direction of movement of the cultivator with portions of the ends of the coils in-wound to form straight lines in the soil over which the cultivator has passed, and the terminal ends extending in a cone-like manner to give a high degree of resilience, thereby enabling it to cultivate the soil and completely remove weeds between rows of cultivated plants without disturbing or harming the plants in the rows and also enabling the coils to free themselves of clinging soil.

The present invention constitutes an improvement over the rotary cultivator disclosed in my copending application Serial No. 324,681, filed December 8, 1952, which issued May 29, 1956 as Patent No. 2,747,490.

I am fully aware of the fact that in the past others have attempted to develop agricultural devices that include a helically coiled ground engaging element. Some of the prior devices consisted of machines that were essentially designed to clear land of stalks, stubble and weeds, and the machine performed its operation over a relatively broad area. Still other machines are konwn to have been made with helically coiled ground working members in the nature of a harrow or the like either to break up clods of soil, or to pack plowed land to prevent drifting in areas subjected to relatively high winds. Some of the prior efforts were also directed toward the cultivation of row crops and the removal of weeds from between the rows, but these devices were not effective because the helix or coil construction caused the lateral extremities of the coil to form jagged or saw toothed edges along the path over which the cultivator passed and the coils were not of a highly resilient nature. The reason that these devices were ineffective was that the prior workers in the field failed to appreciate the necessity of properly forming the outer ends of the coil so that on rotation the coil would not form a saw toothed pattern in the soil, thereby leaving large areas where the soil was not cultivated or the weeds not removed, or alternatively destroying certain of the plants in the crop rows.

The essence of the present invention is in the provision of a coiled element having spaced turns and composed of tempered steel so as to give resiliency in the turns, but more particularly with the ends of the coil formed as an in-wound involute curve or cone extending in the direction of the opposite end of the coil so as to be at least partially within the periphery of the next adjacent turn of the coil. When the helix is thus formed and properly supported, and disposed at an angle to the direction of movement of the cultivator, the opposite edges of the helix form straight lines in the soil, thus enabling the device to work closely to the line of cultivated plants without injury to any of the plants in the rows. Because prior efforts in the field did not recognize this highly important factor, prior cultivators involving a coil or helix were never widely adopted.

Another important feature of the present invention is the provision of an improved journalling support of the opposite ends of the helix to permit both rotative movement and axial flexure of the turns adjacent each end thereof, so that if a hard object is encountered, the helix can either break up the object or rotatably flex about it without disturbing the straight line characteristics that form the essence of my invention. A further feature resides in the provision of means for restraining the central portions of the coil from movement away from the general axis of the helix when the turns of the coil are under stress such as might occur when a hard object is encountered by a coil that is only journalled at its opposite ends. In the present invention I have disclosed the restraining means in the form of rollers positioned beyond the periphery of some of the central turns of the helix to engage any of such turns that become distended when they engage a hard object. Since the rollers are capable of movement on their own axis, they do not impede the rotary movement of the helix or the turns thereof that are forced into engagement with the rollers.

An object of the invention is to provide a rotary cultivator composed of a resilient helix disposed at an angle to the direction of the movement of the cultivator, and formed to cultivate the soil and remove weeds from between crop rows, in which the helix is constructed to form straight parallel edges in the soil thus enabling the ends of the helix to closely approach the crop rows.

Another object is to provide a cultivator in which the essential element is a resilient helix formed of spaced turns and in which each outer end of the coil is formed in an involute curve composed of a major portion of the last turn of the helix and in which the curve extends toward the opposite end of the helix starting in a cone-like shape within the periphery of the next adjacent turn so that when the helix is angularly mounted for rotative movement its opposite ends form straight lines in the soil and provide a high degree of flexibility in the helix so as to thoroughly work the soil without collecting soil between the turns of the helix.

Another object is to support a helix of the construction mentioned above at its opposite ends on journalling means including an adjustable truncated surface to increase or decrease the flexibility of the helix along its central axis.

Another object is to provide a rotary cultivator including a ground engaging helix of the type heretofore described, mounted for rotational movement, and to provide one or more restraining means supported beyond the periphery of the helix to engage any turns thereof that under stress are distended so that their axes are substantially out of alignment with the general axis of the helix, thereby enabling the helix to operate against lumps of hard soil or to flexibly distend and permit stones or other objects to pass between the turns of the coil without damage to the crop row.

A further object is to provide a rotary cultivator which is capable of weeding and cultivating row crops when the cultivator is passed between parallel rows, or of properly thinning row crops when the cultivator is passed transversely to the row crops, by embodying a pair of opposed coils of the type described herein.

Other and further objects may become apparent from the following specification and claims, and in the appended drawings in which:

Fig. 1 is a plan view with parts broken away to show the essential ground engaging coils;

Fig. 2 is a side elevation of one of the coils shown in Fig. 1;

Fig. 3 is a detail view of the connection between one end of the coil shown in Fig. 2 and the supporting bracket;

Fig. 4 is an end view of one of the coils and shows the nature of the involute curve formed on the end of the coil;

Fig. 5 is a sectional view taken on line 5—5 of Fig. 2 showing the restraining rollers;

Fig. 6 is a plan view of the complete rotary cultivator; and,

Fig. 7 is a view taken on line 7—7 of Fig. 6.

Having reference to the several views of the drawing, the invention will now be described in detail. Referring first to Figs. 1 and 2, a transverse bar 10 having extensions 11 and 11a forms a supporting frame for a pair of inverted U-shaped brackets 12 and 12a. Within each of the inverted U-shaped brackets is a helically wound ground engaging coil 13 and 13a. Coil 13 is wound to the left and coil 13a is wound to the right. On the upper portion of each of the supporting brackets 12 and 12a are upright supporting members 14 and 14a that are welded at approximately a 30° angle to the brackets, and which are secured to the bar 10 by means of bolts 15 and 15a.

At each end, the material forming coils 13 and 13a is formed in special curves 23 that are clearly visible in Fig. 4. The curve starts at a point in the periphery of the coil indicated at 33 and extends involutely on a constantly decreasing radius for more than one-half a turn and terminates at the point indicated at 34 which is substantially midway between the periphery of the coil and its central axis. As is clearly shown in Figs. 1 and 2, the end of the coil in addition to being wound in an involute curve, is also in-wound in a cone-like shape in the direction of the opposite end of the coil bringing the last turn at least partially within the periphery of the next adjacent turn of the coil. The construction of the ends of the helix are extremely important for a number of reasons. Primarily this arrangement provides for the straight line edges of the working surface of the coil when the coil is disposed at the angle shown in Fig. 1. Another important feature of the end construction is that the in-winding toward the opposite ends of the helix adds considerably to the resiliency of the turns thereof which form an important function in the cultivating operation since it prevents the collection of soil between the turns. Still further, the end construction of the helix prevents the formation of a wedging or pinching surface that would form a gathering place for weeds and trash over which the cultivator passes. From the point 34 at the end of the involute curve, the terminal portion of the material forming the helix is turned at a right angle to the circumference of the helix, and then formed in a loop 22 coincident with the axis of the helix.

The loops 22 forming the terminal ends of the helix are supported in the inverted U-shaped brackets by bolts 19 having a shank portion that is considerably smaller than the interior diameter of loops 22 and having a truncated or tapered head that snugly engages the curved surface of the material forming the sides of loops 22. Nuts 17 and 20 are disposed on opposite sides of the end portion of the bracket, and a washer 21 is disposed between nut 20 and loop 22 of the helix. The bolts 19 are of sufficient length to provide adjustment with respect to the loops 22 and permit free rotative movement of the helix about its axis as well as a wobbling movement. The bolts also provide longitudinal adjustment for controlling the spring action of the helix.

Each of the U-shaped brackets 12 and 12a also carries a bifurcated bracket 26 which is secured to the main bracket by means of a bolt 24 and nut 25. The bracket 26 is best seen in Fig. 5 and has its bifurcated portions formed on an arc of a curve which is substantially similar to the curvature of the helix. Bracket 26 carries a pair of spaced rollers 31, 32 that are supported for rotative movement by means of bolts 28 and 30 and securing nuts 27 and 29. Roller 31 is disposed above the turns of the helix while roller 32 is disposed in rear of the central axis of the helix. These rollers serve to prevent distortion of parts of the helix that may come into engagement with relatively hard objects such as lumps of soil or stones.

Referring now to Figs. 6 and 7, the extensions 11, 11a extend to an axle 36 on which is journalled a pair of ground engaging wheels 38 that are secured to axle 36 by threaded nuts 40. A draft bar 42 having an arch shaped front portion 44 is journalled on the axle 36. A cross bar or handle 46 is mounted on the outer end of the draft bar 42. Between the cross bar 46 and the arch shaped portion 44 is a connecting link 48 that is connected to the draft bar 42 by a collar 50 with bolts 52 and 52a. The lower end of the link 48 is secured to bar 10 by a bolt 54. The link 48 provides a limited degree of adjustment between the draft bar and the coils, and provides a means of placing weight on the coils so as to hold them in contact with the soil.

The operation of the invention will now be explained. While the device is shown as a hand operated cultivator, it should be clearly understood that it is within the scope of the invention to provide a power driven prime mover such as a tractor capable of pulling the cultivator, and that a multiplicity of cultivating elements or coils may be mounted to operate over several rows of a cultivated crop. As disclosed the wheels 38 straddle a crop row and the helically wound cultivators operate on either side of the crop row and will extend angularly toward two adjacent crop rows. The rotary cultivators are held at a fixed angle of substantially 30° with respect to the cross bar 10 and in such a position they are dragged or scuffed and rotating between the rows. Coil 13 is wound to the left and coil 13a has been wound to the right. This arrangement will cause some of the soil to be moved in an auger-like manner toward the crop row. If it is desired that the cultivators auger the soil in the direction away from the crop row, they may be reversed and secured to the front end of the cross bar 10. The bolts 19 having truncated heads are adjusted with respect to the nuts 17 and 20 according to the condition of the soil. If the soil is relatively hard the bolts will be taken up so as to reduce resilience in the helical cultivators, and will tend to distend the cultivators within the interior of the U-shaped brackets 12 and 12a; whereas if the soil is relatively loose, and containing substantial weed growth, then the bolts are loosened to permit a greater extent of flexible movement of the rotary cultivators along their central axis. Because the shanks of bolts 19 are of smaller diameter than the diameter of loops 22, a loose wobbling shaking relationship exists permitting some flexure of the ends of the coils.

By virtue of the in-wound involute curves on the opposite ends of the coils, the lateral extremities of the coils will be immersed and form straight lines in the soil and weeds or other trash will be prevented from collecting at the ends of the coils. By virtue of the cone-shaped ends of the coils and their loose mounting, the coils rotate on their axis and flex or vibrate considerably as they are dragged over the ground, thereby enabling them to free themselves of soil, and enables them to work even in damp soil. In the event that large clods are broken from the surface of the soil, or rocks or other obstructions encountered, some of the more centrally disposed turns may be subjected to considerable stress, and the rollers 31 and 32 will engage any of the turns that are distorted and hold them substantially in alignment without retarding the rotary movement of the helix. Because the ends of the coils are supported by the truncated surfaces on the inner ends of the heads of bolts 19, the end turns of the coils can flex about the truncated surfaces either breaking up or passing the hard objects between the turns of the coil.

The rotary cultivator arranged and constructed in the manner set forth herein will operate very closely between adjacent crop rows without injury to the cultivated plants and will break up the soil surface and remove all of the weeds between the rows. On the other hand, the operator may be concerned with thinning rows of plants, such as sugar beets, that must be separated one from the other by a substantial distance so as to permit full development of the plants. Under these conditions the cultivator can be operated transversely to the rows, in which case the coils will remove the excess of plants, leaving one row in the space between the inner ends of the coils, and another row beyond the outer edges of the coils.

The drawings submitted herewith are only illustrative of the essential features of the invention, and the parts may be changed as to size and proportion, or a multiplicity of cultivators may be mounted on one supporting structure within the scope of the invention. The invention is defined in the terms of the appended claims.

I claim:

1. A rotary cultivator, comprising a mobile supporting frame, an inverted U-shaped bracket carried by the frame, a spring steel helical coil composed of a multiplicity of spaced turns carried by the bracket with the axis of the coil disposed at an angle to the line of travel of the frame, each end of the coil formed as an involute curve and in-wound in the direction of the opposite end of the coil and at least partially within the periphery of the next adjacent turn of the coil and terminating at the axis of the coil, and means journalling each end of the coil to an outer end of the bracket in such a manner as to permit rotational movement of the coil about its central axis and a limited lateral movement of the turns thereof along the axis of the coil on contact with the ground.

2. A rotary cultivator, comprising a mobile supporting frame, an inverted U-shaped bracket carried by the frame, a spring steel helical coil composed of a multiplicity of spaced turns carried by the bracket with the axis of the coil disposed at an angle to the line of travel of the frame, each end of the coil formed on a curve of continuously reduced radius and extending inwardly in the direction of the opposite end of the coil and at least partially within the periphery of the next adjacent turn of the coil and terminating at the axis of the coil, and means loosely journalling each end of the coil to an outer end of the bracket permitting flexible rotational movement of the coil and a limited lateral movement of the turns thereof along the axis of the coil when the coil contacts the ground.

3. A rotary cultivator, comprising a mobile supporting frame, an inverted U-shaped bracket carried by the frame, a spring steel helical coil composed of a multiplicity of spaced turns carried by the bracket with the axis of the coil disposed at an angle to the line of travel of the frame, each end of the coil formed as an involute curve and in-wound in the direction of the opposite end of the coil and at least partially within the periphery of the next adjacent turn of the coil and terminating at the axis of the coil, means journalling each end of the coil to an outer end of the bracket in such a manner as to permit rotational movement of the coil about its central axis and a limited lateral movement of the turns thereof along the axis of the coil on contact with the ground, and restraining means carried by the frame and extending transversely of the coil radially beyond the circumferential periphery thereof for frictionally engaging individual turns of the coil when the latter are under stress and have their axes distorted from the axis of the coil, to maintain the axes of the several turns in alignment with the general axis of the coil.

4. A rotary cultivator, comprising a mobile supporting frame, an inverted U-shaped bracket carried by the frame, a spring steel helical coil composed of a multiplicity of spaced turns carried by the bracket with the axis of the coil disposed at an angle to the line of travel of the frame, each end of the coil formed on a curve of continuously reduced radius and in-wound in the direction of the opposite end of the coil and at least partially within the periphery of the next adjacent turn of the coil and terminating at the axis of the coil, means loosely journalling each end of the coil to an outer end of the bracket in such a manner as to permit rotational movement of the coil about its central axis and a limited lateral movement of the turns thereof along the axis of the coil on contact with the ground, and at least one rotatable member carried by the frame and extending transversely of the coil radially beyond the periphery thereof for engaging individual turns of the coil when the latter are under stress and have their axes distorted from the axis of the coil, to maintain the axes of the several turns in alignment with the general axis of the coil.

5. A rotary cultivator, comprising a mobile supporting frame, an inverted U-shaped bracket carried by the frame, a spring steel helical coil composed of a multiplicity of spaced turns carried by the bracket with the axis of the coil disposed at an angle to the line of travel of the frame, each end of the coil formed on a curve of continuously reduced radius and extending inwardly in the direction of the opposite end of the coil and at least partially within the periphery of the next adjacent turn of the coil and terminating in a loop at the axis of the coil, and bolt means extending through the loop on each end of the coil and adjustably journaling said coil to the outer ends of the bracket, said bolt means formed with a cone shaped head portion extending inwardly from the loop so the curved surfaces of each loop rolls on the cone shaped portion of the bolt permitting rotational movement of the coil about its axis, a limited lateral movement of the loops with respect to the bolts and providing a wobbling, shaking, vibrating, expanding and contracting movement of all of the turns of the coil.

References Cited in the file of this patent

UNITED STATES PATENTS

| Number | Name | Date |
|---|---|---|
| 375,364 | La Dow | Dec. 27, 1887 |
| 1,191,404 | Clummer | July 18, 1916 |
| 1,743,151 | Malepsy | Jan. 14, 1930 |
| 1,788,165 | Lienhart | Jan. 6, 1931 |
| 1,908,377 | Mael | May 9, 1933 |
| 2,503,317 | Bergquist | Apr. 17, 1950 |